(12) United States Patent
Mueller et al.

(10) Patent No.: US 11,339,826 B2
(45) Date of Patent: May 24, 2022

(54) ROLLER BEARING

(71) Applicant: Schaeffler Technologies AG & Co. KG, Herzogenaurach (DE)

(72) Inventors: Christoph Mueller, Erlangen (DE); Viktor Pfarherr, Hochstadt (DE); Eugen Hess, Furth (DE); Georg Draser, Nuremberg (DE); Patrick Huebschmann, Heiligenstadt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/973,116

(22) PCT Filed: Mar. 20, 2019

(86) PCT No.: PCT/DE2019/100258
§ 371 (c)(1),
(2) Date: Dec. 8, 2020

(87) PCT Pub. No.: WO2019/238153
PCT Pub. Date: Dec. 19, 2019

(65) Prior Publication Data
US 2021/0254662 A1 Aug. 19, 2021

(30) Foreign Application Priority Data
Jun. 14, 2018 (DE) .......................... 102018114240.4

(51) Int. Cl.
*F16C 19/22* (2006.01)
*F16C 19/26* (2006.01)
(Continued)

(52) U.S. Cl.
CPC ............ *F16C 19/225* (2013.01); *F16C 19/26* (2013.01); *F16C 33/4605* (2013.01);
(Continued)

(58) Field of Classification Search
CPC ...... F16C 19/225; F16C 19/26; F16C 19/463; F16C 19/466; F16C 33/585; F16C 33/4605; F16C 33/605; F16C 35/067; F16C 35/077; F16C 2226/74; F16C 2300/02; F16C 226/70; F16C 2226/70
(Continued)

(56) References Cited

U.S. PATENT DOCUMENTS 2,057,102 A   10/1936 Lemeli
2,094,252 A *  9/1937 Young ..................... F16C 19/46
                                                   384/561
(Continued)

FOREIGN PATENT DOCUMENTS

CN    201344204    11/2009
CN    202176613     3/2012
(Continued)

*Primary Examiner* — Marcus Charles
(74) *Attorney, Agent, or Firm* — Volpe Koenig

(57) ABSTRACT

A roller bearing (2) having a sleeve (5), by which a rolling element raceway is formed, and a lid (1) held to the sleeve by a snap-on connection, wherein the lid has securing projections (17), which are directed outward, which protrude beyond the sleeve (5) in the radial direction and are provided for axially fixing the lid in a housing (4) surrounding the sleeve.

13 Claims, 4 Drawing Sheets

(51) Int. Cl.
*F16C 33/46* (2006.01)
*F16C 33/58* (2006.01)
*F16C 33/60* (2006.01)
*F16C 33/06* (2006.01)
*F16C 35/067* (2006.01)
*F16C 35/077* (2006.01)

(52) U.S. Cl.
CPC .......... *F16C 33/586* (2013.01); *F16C 33/605* (2013.01); *F16C 35/067* (2013.01); *F16C 35/077* (2013.01); *F16C 2226/70* (2013.01); *F16C 2226/74* (2013.01); *F16C 2300/02* (2013.01)

(58) Field of Classification Search
USPC ....... 384/456, 537, 539, 559, 561, 564, 569, 384/585, 903; 29/898.07, 989.062
See application file for complete search history.

(56) References Cited

U.S. PATENT DOCUMENTS

| | | | | |
|---|---|---|---|---|
| 3,519,316 | A * | 7/1970 | Gothberg | F16C 33/723 384/486 |
| 3,656,825 | A * | 4/1972 | Manger | F16C 19/26 384/561 |
| 3,889,352 | A | 6/1975 | Bosse | |
| 4,874,349 | A * | 10/1989 | Gall | F16D 3/385 464/14 |
| 7,374,345 | B2 * | 5/2008 | Ilie | F16C 33/7886 384/537 |
| 8,231,275 | B2 * | 7/2012 | Krause | F16C 17/02 384/129 |
| 9,422,982 | B2 * | 8/2016 | Aust | F16C 19/225 |
| 9,726,224 | B2 * | 8/2017 | Suzuki | F16C 33/6651 |
| 2003/0099419 | A1 * | 5/2003 | Vignotto | F16C 33/78 384/539 |
| 2007/0014502 | A1 | 1/2007 | Dagh | |
| 2015/0330450 | A1 | 11/2015 | Aust et al. | |

FOREIGN PATENT DOCUMENTS

| | | | | |
|---|---|---|---|---|
| CN | 103161822 | | 6/2013 | |
| CN | 103836077 | | 6/2014 | |
| CN | 104854358 | | 6/2017 | |
| DE | 1846434 | | 2/1962 | |
| DE | 2409144 | | 8/1974 | |
| DE | 4238147 | | 8/1994 | |
| DE | 19809224 | | 9/1994 | |
| DE | 19748729 | A1 * | 5/1999 | ............ F16C 33/723 |
| DE | 10123965 | | 11/2002 | |
| DE | 102010002043 | | 8/2011 | |
| DE | 10347361 | B4 * | 4/2013 | .......... F16C 33/7886 |
| DE | 102011088299 | | 6/2013 | |
| DE | 102012223222 | | 6/2014 | |
| DE | 102014203828 | | 9/2015 | |
| DE | 102016214261 | A1 * | 2/2017 | ............ F16C 13/006 |
| DE | 102017119477 | | 2/2019 | |
| FR | 2749048 | A1 * | 11/1997 | ............ F16C 43/045 |
| JP | 2000110843 | | 4/2000 | |
| JP | 2007270850 | | 10/2007 | |
| JP | 2009008202 | | 1/2009 | |
| JP | 2014104908 | A * | 6/2014 | ............ F16C 35/067 |
| WO | WO-2006013022 | A1 * | 2/2006 | ............ F16C 33/723 |
| WO | WO-2009033458 | A2 * | 3/2009 | ............ F16C 19/522 |
| WO | 2013087276 | | 6/2013 | |
| WO | 2014057303 | | 4/2014 | |

* cited by examiner

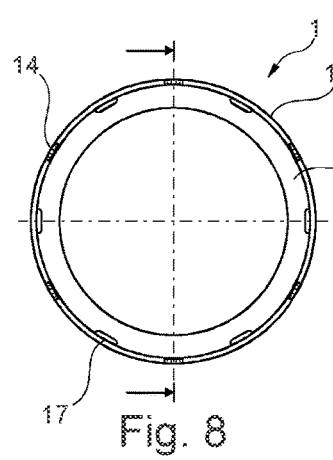
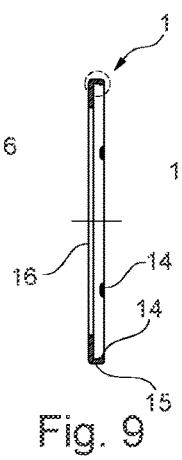
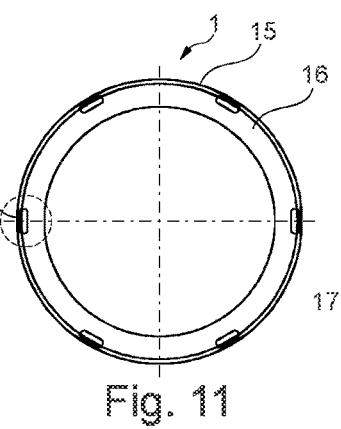
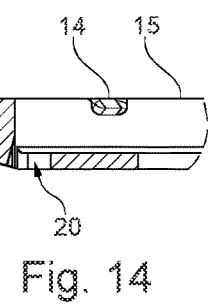
Fig. 8  Fig. 9  Fig. 11  Fig. 14
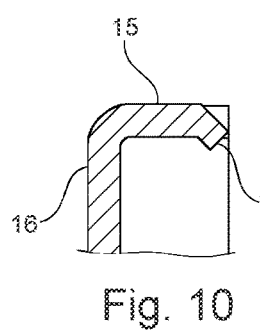
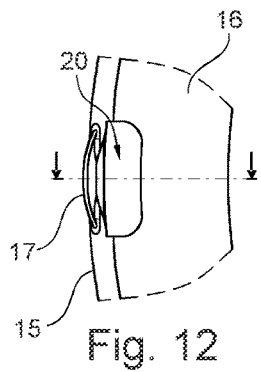
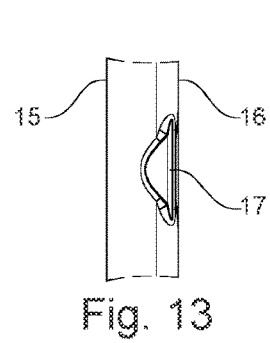
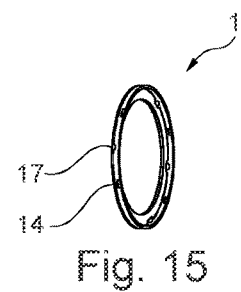
Fig. 10  Fig. 12  Fig. 13  Fig. 15

ROLLER BEARING

CROSS-REFERENCE TO RELATED APPLICATIONS

This application is a 371 National Phase of International Application No. PCT/DE2019/100258, filed Mar. 20, 2019, which claims the benefit of German Patent Application No. 10 2018 114 240.4, filed Jun. 14, 2018.

TECHNICAL FIELD

A roller bearing for installation in a housing and designed as a radial bearing, with features for axially supporting the roller bearing within the housing.

BACKGROUND

From DE 42 38 147 C2, a radial needle bearing with sealing and axial support is known. The radial needle bearing has an outer sleeve with two inwardly facing rims and an inner sleeve with two outwardly facing rims. On the outer circumferential surface of the outer sleeve, there are snap-on tongues which are provided for clawing in a receiving bore in a surrounding component.

DE 10 2014 203 828 A1 describes an assembly-friendly rolling bearing which has a sleeve with a radially inward facing rim. A radially outward-pointing collar is molded onto the sleeve on the end face of the rolling bearing opposite the rim. A lid is attached to the collar, which is directed essentially radially inward and is thus opposite the rim.

DE 101 23 965 B4 discloses a needle bearing, the outer ring of which, i.e., the sleeve, as in the case of DE 10 2014 203 828 A1, is provided with a radially inwardly directed rim only on one side. In the needle bearing according to DE 101 23 965 B4, a radially outwardly bent tab is arranged on the side opposite the rim at least at one circumferential point, against which a projection of a circular ring-shaped thrust disc, i.e., annular disc, rests. The tab and the projection are connected to one another by an attached cap.

SUMMARY

The object is to provide a roller bearing which is further developed compared to the prior art and is production-friendly and which has means for axially securing the bearing in a housing.

This object is achieved by a roller bearing with one or more features described herein. The object is also achieved by a production method having one or more features as described herein. The configurations and advantages of the embodiments explained below in connection with the method also apply analogously to the device, i.e., the rolling bearing, and vice versa.

The roller bearing comprises a sleeve, by which a rolling element raceway is formed, and a lid held to the sleeve by means of a snap-on connection, wherein the lid has securing means which are directed outward, which protrude beyond the sleeve in the radial direction and are provided for axially fixing the lid and thus also the sleeve in a housing surrounding the sleeve.

Roller bearings are generally pressed into a housing with an interference fit. If the overlap were too low, there would be a risk that the sleeve of the bearing would move out of the housing bore during operation. If the overlap is too large, depending on the surrounding construction, there would be a risk of damage to the housing. To counteract these risks, a circumferential knurling could be attached to the sleeve to increase friction.

A fundamentally different approach is provided herein in that an axial securing of a roller bearing is provided not on the sleeve but on a lid connected to the sleeve by means of a snap-on connection. In a preferred embodiment, the securing means, which serve to axially secure the roller bearing in a housing, are integrally formed on the lid at the transition between an annular disc-shaped section and a rim, i.e., a cylindrical section.

The attachment of a lid in the form of an annular disc to a sleeve of a rolling bearing by means of a snap-on connection is described in the subsequently published patent application DE 10 2017 119 477.0. Accordingly, in the present case, snap-on locking means, in particular in the form of a locking groove, are provided on one side of the sleeve, on which corresponding snap-on locking means of the annular disc are fixed. The snap-on locking means of the ring disc, i.e., of the lid, are preferably designed as snap-on projections distributed around the circumference.

According to a first possible embodiment, each securing means is arranged within a closed wall of the lid. In an alternative embodiment, each securing means borders on an opening in the lid. The opening is preferably exclusively or predominantly located within the annular disc-shaped section of the lid.

Regardless of whether the securing means are completely or incompletely surrounded by the material of the lid, the lid preferably has multiple snap-on locking means to be fixed on the sleeve, wherein the radially outwardly directed securing means provided for retention in a housing on the one hand and the snap-on locking means on the other hand are arranged alternately on the circumference of the lid.

The roller bearing lid can be manufactured in the following steps:
  Providing an annular disc-shaped blank,
  Forming a rim on the outer edge of the blank,
  Forming radially inwardly directed snap-on locking means on the edge of the rim for producing a snap-on connection with a sleeve of the roller bearing,
  Forming radially outwardly directed securing means suitable for fixing the lid in a housing bore, which protrude from the rim.

The sequence in which the various contours of the lid to be manufactured from the blank in the form of an annular disc are formed is not fixed. Like the snap-on locking means, the securing means are preferably produced without machining steps. This applies both in variants in which the securing means are produced without producing an opening, i.e., a through opening, of the blank, and in variants in which the securing means are produced in the lid by producing an opening.

In the latter case, the forming of the securing means and the openings can include the method steps of punching and embossing. During embossing, material of the annular disc-shaped section of the blank is displaced outward in the radial direction. Such an embossing process can be carried out, for example, using a conical stamp. Alternatively, the forming of the securing means while breaking open the surface of the blank can include the method steps of punching and cutting bending. With regard to cutting bending, reference is made, for example, to documents DE 198 09 224 A1 and DE 10 2010 002 043 A1.

The rolling elements of the roller bearing, which roll in the cylindrical section of the sleeve, have a cylindrical basic shape. In particular, the rolling elements can be cylindrical rollers or needle rollers.

The cylindrical rolling elements can be guided in a cage. This is designed, for example, as a window cage. The window cage has two cage rings which are connected to one another by webs, wherein pockets for receiving a rolling element are formed between the webs respectively. One of the two cage rings is preferably adjacent to a rim of the sleeve, in particular arranged radially within the rim formed on the sleeve, forming an annular gap. The second cage ring, on the other hand, is arranged close to the lid, which is connected to the sleeve by a snap-on connection. This cage ring adjacent to the lid is preferably larger than the cage ring adjacent to the rim of the sleeve. In a preferred embodiment, this applies both to a comparison between the outside diameters of the two cage rings and to a comparison between the inside diameters of the two cage rings. The cage ring adjacent to the rim preferably has an outer diameter larger than the inner diameter of the cage ring adjacent to the lid, but which is smaller than the outer diameter of said cage ring.

The roller bearing is suitable for producing a bearing arrangement that has a housing in addition to the roller bearing. The sleeve and lid are inserted into a bore in the housing. According to a first fastening variant, the securing means of the lid engage in a groove in the housing. Alternatively, the securing means of the lid are designed as self-tapping securing elements to be inserted into a smooth bore in the housing. The securing means thus claw into an initially smooth housing wall. With regard to self-separating fasteners, reference is also made to DE 2 409 144 A.

Overall, according to a first variant, a bearing arrangement thus comprises a roller bearing and a housing in which the sleeve and the lid are inserted, wherein the securing means of the lid engage in a groove in the housing.

According to a second variant, a bearing arrangement comprises a roller bearing and a housing into which the sleeve and the lid are inserted, wherein the securing means of the lid are designed as self-separating securing elements to be inserted into a smooth bore in the housing.

BRIEF DESCRIPTION OF THE DRAWINGS

The roller bearing designed according to the invention is explained in more detail below in three preferred embodiments with reference to the accompanying drawings. In the figures:

FIG. 8 shows a second embodiment of a lid of a roller bearing in an end view,

FIG. 9 shows the lid according to FIG. 8 in a sectional view,

FIG. 10 shows a detail from FIG. 9,

FIG. 11 shows the lid according to FIG. 8 in a view analogous to FIG. 4,

FIG. 12 shows a detail from FIG. 11,

FIG. 13 shows a detail view of the lid according to FIG. 8,

FIG. 14 shows a further detail view of the lid according to FIG. 8,

FIG. 15 shows the lid according to FIG. 8 in a perspective view,

DETAILED DESCRIPTION

Unless otherwise stated, the following explanations relate to all exemplary embodiments. Parts or contours that correspond to each other or have basically the same effect are marked with the same reference symbols in all figures.

Figure 1:
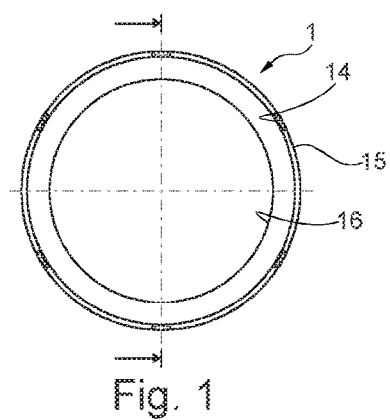
FIG. 1 shows a first embodiment of a lid of a roller bearing in an end view.
Figure 2:
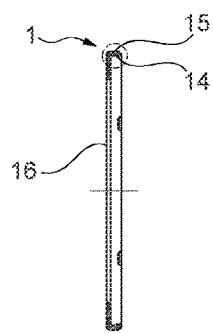
FIG. 2 shows the lid according to FIG. 1 in a sectional view.
Figure 4:
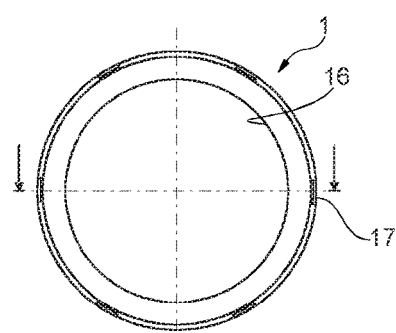
FIG. 4 shows another end view of the lid according to FIG. 1.
Figure 3:
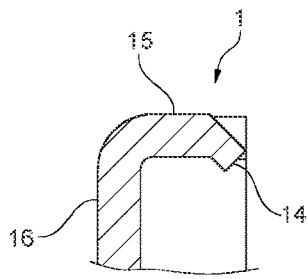
FIG. 3 shows a detail from FIG. 2.
Figure 6:
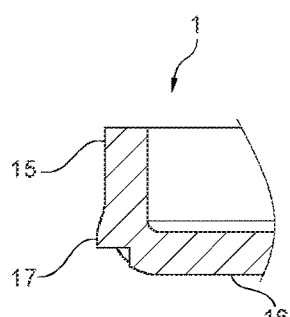
FIG. 6 shows a detail from FIG. 5.
Figure 5:
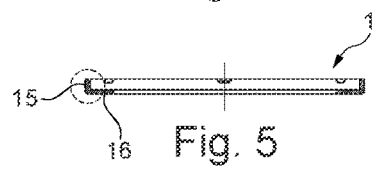
FIG. 5 shows a further sectional view of the lid according to FIG. 1.
Figure 7:
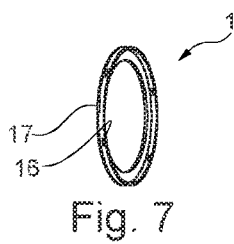
FIG. 7 shows the lid according to FIG. 1 in a perspective view.
Figure 16:
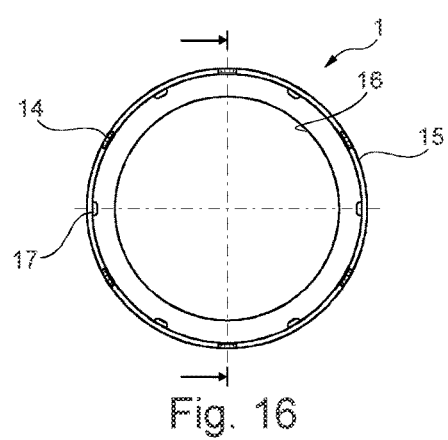
FIG. 16 shows a third embodiment of a lid for a roller bearing in an end view.
Figure 17:
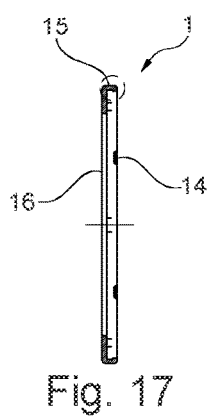
FIG. 17 shows the lid according to FIG. 16 in a sectional view.
Figure 19:
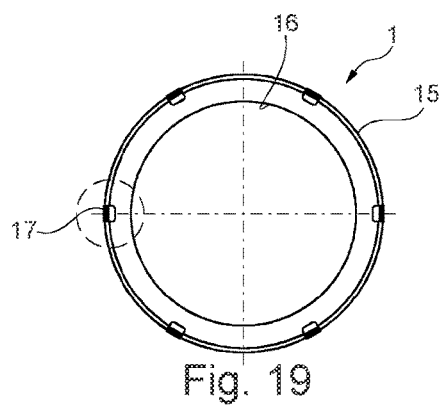
FIG. 19 shows the lid according to FIG. 16 in a view analogous to FIG. 4.
Figure 18:
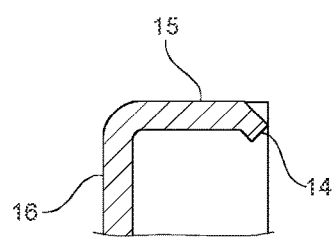
FIG. 18 shows a detail from FIG. 17.
Figure 20:
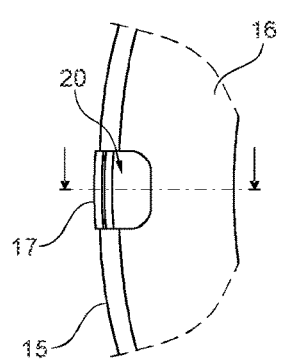
FIG. 20 shows a detail view of the lid according to FIG. 16.
Figure 21:
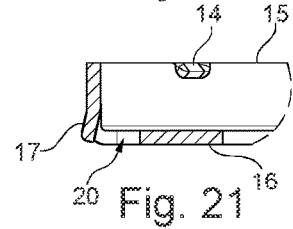
FIG. 21 shows a further detail view of the lid according to FIG. 16.
Figure 22:
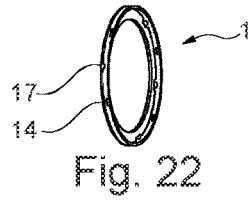
FIG. 22 shows the lid according to FIG. 16 in a perspective view.
Figure 23:
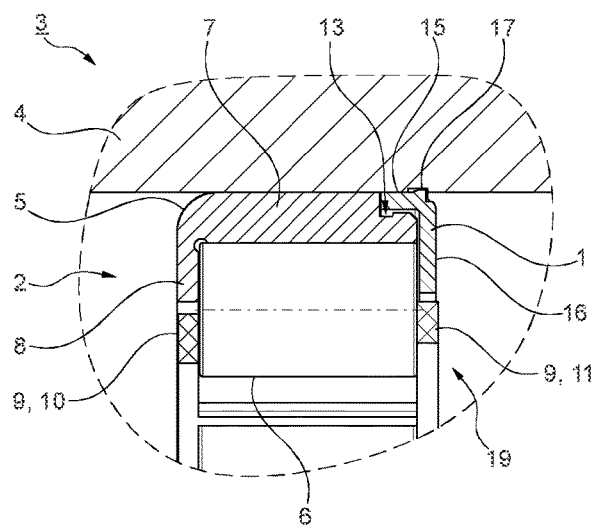
FIG. 23 shows a sectional view of a bearing arrangement section, which comprises a roller bearing having a sleeve and a lid according to FIG. 1 held there by means of a snap-on connection.
Figure 24:
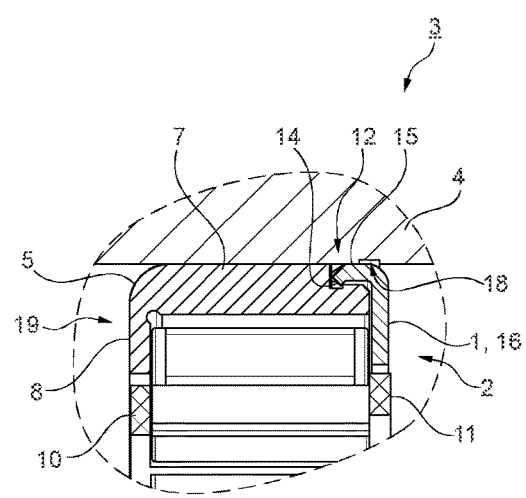
FIG. 24 shows a sectional view of a further bearing arrangement section, which comprises a roller bearing having a sleeve and a lid according to FIG. 1 held there by means of a snap-on connection.

A lid 1 manufactured as a sheet metal part, which is shown in FIGS. 1 to 7, is used in a roller bearing 2 shown in FIGS. 23 and 24. Likewise, the lid 1 shown in FIGS. 8 to 15 and the lid 1 shown in FIGS. 16 to 22 is suitable for use in the roller bearing 2. The roller bearing 2 is part of a bearing arrangement that is identified overall by the reference numeral 3. In addition to the roller bearing 2, the bearing arrangement 3 comprises a housing 4 in which the roller bearing 2 is accommodated, wherein the roller bearing 2 is secured in relation to the housing 4 in the axial direction.

The roller bearing 2 is designed as a radial bearing and comprises a sleeve 5, in which rollers 6, namely cylindrical rollers, roll as rolling elements. The rolling elements 6 roll in a cylindrical section 7 of the sleeve 5. At exactly one end face of the sleeve 5, the cylindrical section 7 is followed by a radially inwardly directed rim 8, on which the rolling elements 6 can run with their end faces. The rolling elements 6 are guided in a cage 9 made of plastic and designed as a window cage. The cage 9 has two cage rings 10, 11, which are connected to one another by webs with the formation of pockets for receiving a respective rolling element 6. The cage ring 10, which is arranged radially directly inside the rim 8 and is referred to as a cage ring close to the rim, has a smaller diameter than the second cage ring 11 arranged on the opposite end face of the roller bearing 2. The disc 1 is located radially outside of said cage ring 11. This is connected to the cylindrical section 7 of the sleeve 5 by means of a snap-on connection 12. For this purpose, the cylindrical section 7 has a circumferential groove 13. Snap-on locking means 14, which are formed by the lid 1 and are located on a cylindrical section 15 of the lid 1, engage in the groove 13. The cylindrical section 15, which is also referred to as a rim, is adjoined by a radially inwardly directed annular disc-shaped disc section 16, i.e., disc section, of the lid 1. The lid 1 thus describes an overall flat, non-closed pot shape.

The disc section 16 lies in a plane oriented normal to the axis of rotation of the roller bearing 2, i.e., to the central axis of the bearing arrangement 3. In the transition area between the disc section 16 and the cylindrical section 15, distributed around the circumference of the lid 1, there are multiple securing means 17, which are also referred to as securing lugs. The securing means 17 engage in a groove 18 in the housing 4. Alternatively, the securing means could be clawed into the housing 4. In any case, the securing means 17 protrude beyond the sleeve 5 in the radial direction. The securing means 17 not only secure the lid 1, but the entire roller bearing 2 within the housing 4 in the axial direction. A shaft on which the rolling elements 6 roll is not shown in the figures. Instead of directly on a shaft, the rolling elements 6 could also roll on an inner bearing ring connected to a further rotating component. The assembly of the sleeve 5, the lid 1 fastened thereto by means of a snap-on connection 12, and the rollers 6 guided in the cage 9 is referred to as roller sleeve 19.

The lid 1 has a corresponding number of snap-on locking means 14 and securing elements 17, wherein the snap-on locking means 14 and the securing means 17 are arranged alternately on the circumference of the lid 1. In the exemplary embodiments, the lid has six snap-on locking means 14, which can be attributed to the snap-on connection 12, and securing means 17. The snap-on locking means 14, like the securing means 17, are non-cutting contours of the lid 1. The lid 1 is more thin-walled than the sleeve 5.

In the exemplary embodiment according to FIGS. 1 to 7, the securing means 17, i.e., the securing lugs, are produced as embossings on the base. During the embossing process, material of the disc section 16 is mainly displaced radially outward, so that the securing lugs 17 thus created, which are located in the transition region between the disc section 16 and the cylindrical section 15, project radially outward beyond the remaining cylindrical section 15. In the case illustrated in FIGS. 1 to 7, the securing means 17 are completely surrounded by the material of the lid 1. This means that no openings in the lid 1 border on a securing lug 15.

In contrast to this, in the exemplary embodiment according to FIGS. 8 to 15, as in the exemplary embodiment according to FIGS. 16 to 22, there is an opening 20 next to each securing means 17 in the disc section 16 of the lid 1. In the case of FIGS. 8 to 15, the disc section 16, i.e., the base, of the lid 1 is first perforated to produce the securing means 17. This is followed by an embossing process with a conical stamp in order to bend the securing means 17 outward. Also in the exemplary embodiment according to FIGS. 16 to 22, the disc section 16 is first perforated at locations at which the securing means 17 are to be formed. In this case, the final shaping of the securing means 17 takes place by cutting bending.

LIST OF REFERENCE SYMBOLS

1 Lid
2 Roller bearing
3 Bearing arrangement
4 Housing
5 Sleeve
6 Rolling element
7 Cylindrical section of the sleeve
8 Rim
9 Cage
10 Cage ring
11 Cage ring
12 Snap-on connection
13 Groove in the sleeve
14 Snap-on locking means
15 Cylindrical section of the lid, rim
16 Disc section
17 Securing means
18 Groove in the housing
19 Roller sleeve
20 Opening

The invention claimed is:

1. A roller bearing, comprising:
a sleeve which forms a rolling element raceway; and
a lid held to the sleeve by a snap-on connection, the lid including integrally formed securing protrusions which are directed outward and protrude beyond the sleeve in a radial direction at a transition between an annular disc-shaped section and a rim of the lid and are adapted to axially fix the lid in a housing surrounding the sleeve.

2. The roller bearing according to claim 1, wherein each of the securing protrusions is arranged within a closed wall of the lid.

3. The roller bearing according to claim 1, wherein each of the securing protrusions borders an opening in the lid.

4. The roller bearing according to claim 1, wherein the lid further comprises a plurality of snap-on locking elements held on the sleeve, and the securing protrusions and the snap-on locking elements are arranged alternately about a circumference of the lid.

5. A method for producing a lid of a roller bearing, comprising:
providing an annular disc-shaped blank,
forming a rim on an outer edge of the blank,
forming radially inwardly directed snap-on locking elements on an edge of the rim that are adapted for a snap-on connection with a sleeve of the roller bearing, and
forming radially outwardly directed securing protrusions that protrude from the rim at a transition between the annular disc-shaped section of the blank and the rim and are adapted for fixing the lid in a housing bore.

6. The method for producing a lid according to claim 5, further comprising forming the securing protrusions without breaking through a surface of the blank.

7. The method for producing a lid according to claim 5, further comprising creating the securing protrusions by creating an opening in a surface of the blank at a transition between an annular disc-shaped section of the blank and the rim.

8. The method according to claim 7, further comprising forming the openings by punching and embossing.

9. The method according to claim 7, further comprising forming of the openings by punching and cutting bending.

10. A roller bearing, comprising:
a sleeve that forms a rolling element raceway;
rolling elements located in the raceway;
a lid held to the sleeve by a snap-on connection, the lid including radially outwardly directed securing protrusions that protrude beyond the sleeve, the securing protrusions being adapted to axially fix the lid in a housing surrounding the sleeve;

the snap-on connection includes a plurality of radially inwardly extending projections on the lid that engage in a groove in an outer surface of the sleeve; and the lid includes an annular disc-shaped section and an axially extending rim, the plurality of radially inwardly extending projections are located on the rim, and the radially outwardly directed securing projections are located at a transition between the disc-shaped section and the rim.

11. The roller bearing of claim 10, further comprising a plurality of circumferentially spaced openings in the lid in the disc-shaped section, and the radially outwardly directed securing projections are located adjacent to the openings.

12. The roller bearing of claim 10, wherein the radially outwardly directed securing projections are integrally formed of displaced material from the disc-shaped section.

13. The roller bearing of claim 10, wherein the plurality of radially inwardly extending projections and the radially outwardly directed securing projections are arranged alternately in a circumferential direction.

* * * * *